United States Patent
Lin et al.

(10) Patent No.: US 12,484,131 B2
(45) Date of Patent: Nov. 25, 2025

(54) SPACE LIGHTING SYSTEM BASED ON ENERGY-SAVING TARGET

(71) Applicants: Self Electronics Co., Ltd., Zhejiang (CN); Wanjiong Lin, Zhejiang (CN); Self Electronics USA Corporation, Norcross, GA (US)

(72) Inventors: Wanjiong Lin, Zhejiang (CN); Jian Zhang, Zhejiang (CN); Huangfeng Pan, Zhejiang (CN); Linji Wang, Zhejiang (CN); Hong Li, Zhejiang (CN)

(73) Assignee: Self Electronics Co., Ltd., Ningbo (CN)

( * ) Notice: Subject to any disclaimer, the term of this patent is extended or adjusted under 35 U.S.C. 154(b) by 89 days.

(21) Appl. No.: 18/585,439

(22) Filed: Feb. 23, 2024

(65) Prior Publication Data

US 2024/0292506 A1    Aug. 29, 2024

(30) Foreign Application Priority Data

Feb. 26, 2023   (CN) .......................... 202310208683.9

(51) Int. Cl.
*H05B 47/14*     (2020.01)
*H05B 47/115*    (2020.01)
*H05B 47/165*    (2020.01)
*H05B 47/175*    (2020.01)

(52) U.S. Cl.
CPC ........... *H05B 47/115* (2020.01); *H05B 47/14* (2020.01); *H05B 47/165* (2020.01); *H05B 47/196* (2024.01)

(58) Field of Classification Search
CPC .... H05B 47/14; H05B 47/115; H05B 47/125; H05B 47/155; H05B 47/165; H05B 47/196
See application file for complete search history.

(56) References Cited

U.S. PATENT DOCUMENTS

| | | | |
|---|---|---|---|
| 11,246,205 B1 * | 2/2022 | Tay | G21G 4/02 |
| 2019/0045180 A1 * | 2/2019 | Caicedo Fernandez | H04N 23/667 |
| 2019/0116645 A1 * | 4/2019 | Tiberi | H05B 47/1965 |
| 2019/0380188 A1 * | 12/2019 | Hovers | H05B 47/115 |
| 2020/0082551 A1 * | 3/2020 | Steiner | H05B 47/115 |
| 2022/0326342 A1 * | 10/2022 | Verbrugh | G01S 5/16 |
| 2024/0255354 A1 * | 8/2024 | Murthy | G01J 5/12 |

* cited by examiner

*Primary Examiner* — Tung X Le
(74) *Attorney, Agent, or Firm* — Wang Law Firm, Inc.

(57) ABSTRACT

A space lighting system based on energy-saving target has a control device and an execution device. The execution device is one or more luminaires arranged inside the space; the control device configures the dimming parameters of the execution device according to the passenger density in the space based on the energy-saving target of the space lighting system. The space lighting system optimizes the dimming effect according to the passenger flow density under the constraint of setting conditions based on the energy-saving target so as to improve the customer experience.

10 Claims, 1 Drawing Sheet

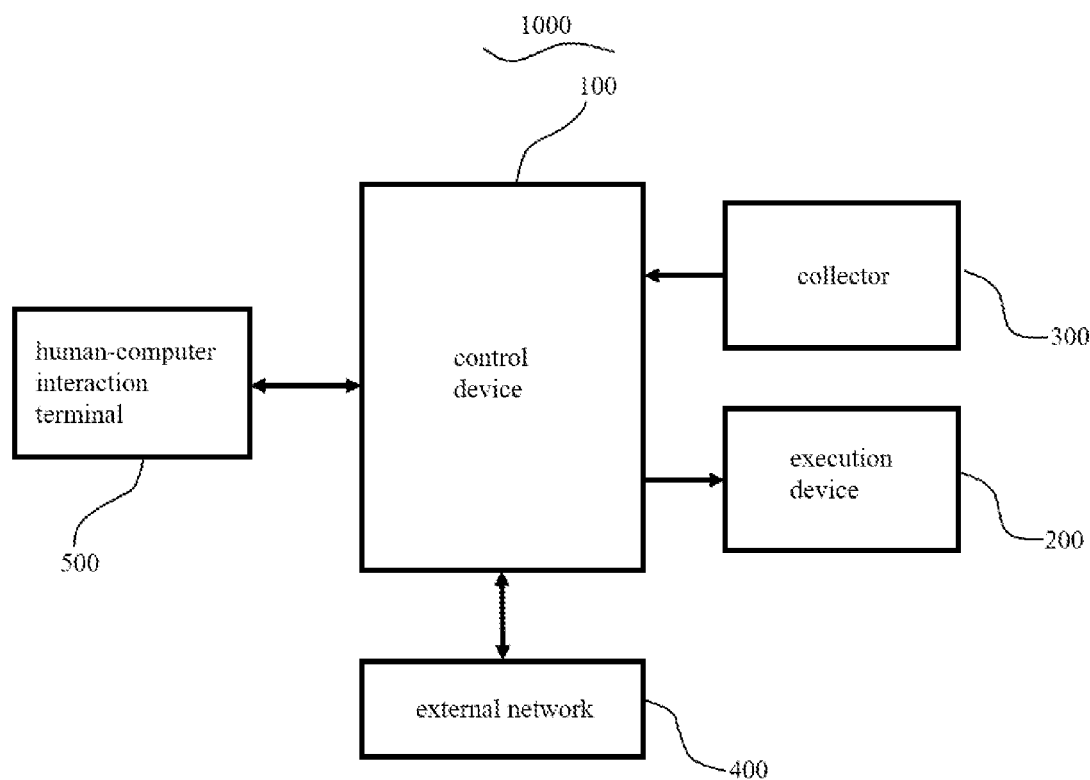

SPACE LIGHTING SYSTEM BASED ON ENERGY-SAVING TARGET

RELATED APPLICATION

This application claims priority to a Chinese Patent Application No. CN 202310208683.9, filed on Feb. 26, 2023.

FIELD OF THE TECHNOLOGY

The invention relates to the technical field of lighting technology, in particular to a space lighting system based on energy-saving target.

BACKGROUND

Due to the escalation of global environmental problems and energy crisis, the demand for energy saving and low-carbon in lighting system is growing. One of the existing lighting system solutions is to use manual switching, which is time-consuming and ineffective; and another one is to use a timing method, based on experience value, with fixed period adjustment, which is inflexible and ineffective. What's more, cameras and other types of image acquisition devices are used to identify and judge the flow of people in the lighting space, and excessive collection of biological information will bring about adverse consequences such as personal privacy leakage.

SUMMARY OF THE INVENTION

In view of this, it is necessary to provide a space lighting system based on energy-saving target to meet the requirements of safety as well as energy saving and low carbon to overcome the above deficiencies.

To achieve the above object, the present invention provides a space lighting system, comprising a control device and an execution device, the execution device is one or more luminaires and arranged inside the space; the control device configures the dimming parameters of the execution device according to the passenger density in the space based on the energy-saving target of the space lighting system.

Optionally, the space lighting system provided by the present invention also comprises a collector that collects the number of people in the space; the collector is connected with the control device or embedded in the control device. In this way, by embedding or connecting externally with the control device, the collector can collect the number of people in the space, which is convenient to quantify the flow of people in the space, and more reasonably to adjust the dimming settings.

Optionally, the control device obtains and records the number of people collected by the collector at regular intervals in accordance with a collection period, records the actual energy-saving results of the system, stores historical data in n rolling periods each time, in which n≥1, and automatically overwrites the historical data of the 1st rolling period with the historical data of the n+1th rolling period, and so on iteratively updates the historical data stored by the control device. In this way, the number of people in the space collected by the collector, i.e. the flow of people in the space, is recorded periodically. By setting the rolling period, the historical data is strongly correlated with the latest data.

Optionally, the control device performs AI learning according to historical data stored by the system to set current dimming parameters. In this way, without additional manual input, the system can self-learn to set the latest dimming parameters by matching a compatible AI learning model with the historical data stored by the system.

Optionally, the control device determines an energy-saving dimming scheme for the next period based on the difference between the cumulative energy saving of the system and the target energy saving with reference to the flow of people in n rolling periods. Similarly, without additional manual input, the system performs automated deduction with reference to the periodical historical data and continuously self-corrects to determine the energy-saving dimming scheme for the next period.

Optionally, the space lighting system provided by the present invention also includes a human-computer interaction terminal; the human-computer interaction terminal is connected with the control device or embedded in the control device. The energy-saving target is entered by the human-computer interaction terminal and sent to the control device. In addition, the human-computer interaction terminal is configured with a touch display or buttons for data and information entry. In this way, by setting the human-computer interaction terminal, it is convenient to check the number of people in the space and the dimming parameters, as well as to enter the energy-saving targets, etc.

Optionally, the control device is connected with an external network, and the external network can connect to a plurality of the control devices; the external network can send energy-saving target to the control device, or the control device matches and obtains the energy-saving target by means of the system parameters entered through the matching relationship between the system parameters and the energy-saving target preset in the external network. In this way, centralized management of multiple different local end space lighting systems can be achieved.

Optionally, the collector is arranged at the entrance of the space to record the number of people entering the space during each collection period; or the collector is arranged at both the entrance of the space and at the exit of the space to record the number of people entering and exiting the space during each collection period, respectively. This facilitates the accuracy of the actual number of people staying in the space and the realization of better matched dimming settings.

Optionally, the dimming parameter includes dimming brightness and/or dimming ratio, and the energy-saving target includes energy-saving ratio and/or an energy-saving value.

Optionally, the space in a supermarket, a shopping mall, a store or a museum. Applying the space lighting system provided by the present invention in such spatial environments ensures that it a higher degree of scene matching, and the dimming judgment is more accurate, thus ensuring a better dimming effect.

Compared with the prior art, the present invention provides a system that adjusts the dimming parameters of the luminaires according to the density of the passenger flow in the space on the premise that there is a requirement for an energy-saving target. In particular, a corresponding collector is set according to the specific space to obtain the number of people in the space, and the system's historical data is updated on a rolling basis, and then combined with the system's AI learning and self-adaptation, to realize intelligent control of the dimming parameters of the lighting system, optimize the dimming effect, and enhance the customer experience.

BRIEF DESCRIPTION OF THE DRAWINGS

Embodiments of the present invention will be described below with reference to the drawings, in which:

FIG. 1 is a schematic structural diagram of an embodiment of a space lighting system involved in the present invention.

DETAILED DESCRIPTION OF THE INVENTION

Specific embodiments of the present invention will be described in further detail below based on the drawings. It should be understood that the description of the embodiments of the present invention herein is not intended to limit the protection scope of the present invention.

The present invention relates to the application of a space lighting system, hereinafter referred to as the system 1000, based on the energy-saving target, wherein the space refers to an indoor space that can carry a certain amount of passenger flow, such as a viewing arena, a supermarket, a shopping mall, a store, a museum of literature, and the like. It is understandable that the behavioral activities of people in such specific spaces have certain regularity and repeatability. More specifically, for example, a large supermarket has its own pattern of passenger flow in various time period every day of week. And it is very likely that after work the passenger flow is significantly higher than that during working hours, and the passenger flow on the weekend is significantly higher than that on the weekday. The space lighting system provided by the present invention is based on the premise of the objective existence of such sociological regularity.

FIG. 1 is an embodiment of the space lighting system provided by the present invention applied in a supermarket. In such supermarket we can understand that the area of the specific supermarket is actually relatively fixed. Based on the specific geographic location of the supermarket and the like, combined with hot spot analysis of big data, it can be preliminarily considered that the consumption habits of the crowd under such model, or their stay time, are also relatively fixed. In this embodiment, the system 1000 comprises a control device 100 and an execution device 200, wherein the execution device 200 refers to one or more luminaires, and the control device 100 can be a device for control use such as a PLC, a CPU, and a microcontroller, and specifically in this embodiment, the control device is a central processing unit CPU as an example. In such system 1000, as the energy-saving target has been defined, the control device 100 can configures the dimming parameters of the execution device 200 according to the passenger density in the space, where the dimming parameter can include but not limited to dimming brightness and dimming ratio, etc., and the energy-saving target can include but not limited to an energy-saving ratio and an energy-saving value, etc. And the energy-saving target paraphrase is equivalent to the target energy-saving.

The system 1000 further comprises a collector 300. The collector 300 is connected to or embedded in the control device 100. And the control device 100 can read to the collector 300 the number of people in the space that the collector 300 has collected. The collector 300 herein can be set either at the entrance of the space to record the number of people entering the space during each collection period; or it can be set at the entrance and exit of the space respectively to record the number of people entering and exiting the space during each collection period. With this setting, the number of people in the space, especially the number of people staying in the space, is more accurately captured. The collection period here can be as short as possible, depending mainly on the response time of the collector 300.

The collector 300 can be selected as a sensor, specifically a microwave sensor, an ultrasonic sensor, etc., and in this embodiment, an ultrasonic sensor is preferred in consideration of the accuracy and safety of the collected data.

The system 1000 also includes a human-computer interaction terminal 500 that is connected with, or embedded in, the control device 100. In addition, the human-computer interaction terminal 500 has a touch display or buttons for data and information entry. Specifically, the human-computer interaction terminal 500 herein can be a mobile phone, a tablet, or other interactive devices. The administrator can enter the energy-saving target via the human-computer interaction terminal 500 and communicated it to the control device 100.

The system 1000 further includes an external network 400. The external network 400 can connect a plurality of the control devices 100. Through the external network 400 energy-saving targets can be sent to all the control devices, realizing unified management and control by administrators. In another way, the control device 100 matches and obtains the energy-saving target by means of the system parameters entered through the matching relationship between the system parameters and the energy-saving target preset in the external network 400.

Briefly, the system 1000 of this embodiment comprises a control device 100, an external network 400, a human-computer interaction terminal 500 and a plurality of luminaires 200 arranged in a space and at least one collector 300 provided at the entrance of the space. In this embodiment, the plurality of luminaires are ceiling lamps dispersedly arranged within a shopping area within a supermarket.

The collector 300 collects the number of people entering the space, and then accumulates and records it. The control device 100 reads the number of people entering the space from the collector 300, and after each reading, the collector 300 automatically resets and begins counting again. The data read from the collector 300 according to the period and the actual energy-saving results of the system 1000, is stored by the control device 100 as historical data according to n rolling periods each time, in which n≥1, and automatically overwrites the historical data of the 1st rolling period with the historical data of the n+1th rolling period, and so on iteratively updates the historical data stored by the control device 100.

The data on the number of people in the space collected by the collector 300 is recorded periodically, and by setting the rolling period, it is ensured that the historical data is strongly correlated with the latest data. With such historical data basis, the control device performs AI learning to set the current dimming parameters according to the historical data stored by the system. In this way, without additional manual input, the system can self-learn to set the latest dimming parameters by matching a compatible AI learning model with the historical data stored by the system.

The control device can also determine an energy saving dimming scheme for the next period based on the difference between the cumulative energy saving of the system and the target energy saving with reference to the flow of people in n rolling periods. Similarly, without additional manual input, the system performs automated deduction with reference to the periodical historical data and continuously self-corrects to determine the energy-saving dimming scheme for the next period In addition, the target energy-saving ratio can be set on the display screen of human-computer interaction terminal 500.

And the number of people currently staying in the space as well as the dimming brightness value will be displayed in real time and plotted.

The above are only preferred embodiments of the present invention, and are not used to limit the protection scope of the present invention. Any modification, equivalent replacement or improvement within the spirit of the present invention is covered by the scope of the claims of the present invention.

What is claimed is:

1. A space lighting system based on an energy-saving target, comprising a control device (100) and an execution device (200), wherein,
   the execution device (200) is one or more luminaires, arranged inside a space;
   the control device (100) configures dimming parameters of the execution device (200) according to a passenger density in the space based on the energy-saving target of the space lighting system (1000);
      the space lighting system based on the energy-saving target further comprises a collector (300) that collects a number of people in the space; and the collector (300) is connected with the control device (100) or embedded in the control device (100);
      characterized in that,
      the control device (100) obtains and records the number of people collected by the collector (300) at regular intervals in accordance with a collection period, records the actual energy-saving results of the system, stores historical data in n rolling periods each time, in which n≥1, and automatically overwrites the historical data of the 1st rolling period with the historical data of the n+1th rolling period, and so on iteratively updates the historical data stored by the control device (100).

2. The space lighting system based on the energy-saving target as claimed in claim 1, wherein,
   the control device (100) performs AI learning according to historical data stored by the system to set current dimming parameters.

3. The space lighting system based on the energy-saving target as claimed in claim 1, wherein,
   the control device (100) determines an energy-saving dimming scheme for the next period based on the difference between the cumulative energy saving of the system and the target energy saving with reference to the flow of people in n rolling periods.

4. The space lighting system based on the energy-saving target as claimed in claim 1, further comprising a human-computer interaction terminal (500);
   the human-computer interaction terminal (500) is connected with the control device (100) or embedded in the control device (100).

5. The space lighting system based on the energy-saving target as claimed in claim 4, wherein,
   the energy-saving target is sent to the control device (100) after being entered into the human-computer interaction terminal (500).

6. The space lighting system based on the energy-saving target as claimed in claim 4, wherein,
   the human-computer interaction terminal (500) is configured with a touch display or buttons for data and information entry.

7. The space lighting system based on the energy-saving target as claimed in claim 1, wherein,
   the control device (100) is connected with an external network (400), and the external network (400) is configured to connect to a plurality of the control devices (100);
   the external network (400) can send energy-saving target to the control device (100), or
   the control device (100) matches and obtains the energy-saving target by means of the system parameters entered through the matching relationship between the system parameters and the energy-saving target preset in the external network (400).

8. The space lighting system based on the energy-saving target as claimed in claim 1, wherein,
   the collector (300) is arranged at the entrance of the space to record the number of people entering the space during each collection period; or the collector (300) is arranged at both the entrance of the space and at the exit of the space to record the number of people entering and exiting the space during each collection period, respectively.

9. The space lighting system based on the energy-saving target as claimed in claim 1, wherein,
   the dimming parameter includes dimming brightness and/or dimming ratio, and the energy-saving target includes energy-saving ratio and/or an energy-saving value.

10. The space lighting system based on the energy-saving target as claimed in claim 1, wherein,
    the space is a supermarket, a shopping mall, a store or a museum.

\* \* \* \* \*